US012504886B2

United States Patent
Nicosia et al.

(10) Patent No.: US 12,504,886 B2
(45) Date of Patent: Dec. 23, 2025

(54) SELF-OPTIMIZING CORRECTIVE READ OFFSETS WITH LATERAL CHARGE MIGRATION PROXIES

(71) Applicant: Micron Technology, Inc., Boise, ID (US)

(72) Inventors: Gianluca Nicosia, Boise, ID (US); Akira Goda, Tokyo (JP); Niccolo Righetti, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 173 days.

(21) Appl. No.: 18/407,366

(22) Filed: Jan. 8, 2024

(65) Prior Publication Data

US 2024/0231642 A1    Jul. 11, 2024

Related U.S. Application Data

(60) Provisional application No. 63/438,442, filed on Jan. 11, 2023.

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC .... G06F 3/0619; G06F 3/0659; G06F 3/0679; G11C 29/44; G11C 16/26; G11C 29/50; G11C 2029/5004
USPC ...................................... 365/185.24
See application file for complete search history.

(56) References Cited

U.S. PATENT DOCUMENTS

| | | | |
|---|---|---|---|
| 2023/0043775 A1* | 2/2023 | Chen | G11C 7/20 |
| 2023/0335201 A1* | 10/2023 | Tanaka | G11C 11/5642 |
| 2023/0360696 A1* | 11/2023 | Tseng | G11C 11/4085 |
| 2024/0177795 A1* | 5/2024 | Chang | G11C 16/26 |

* cited by examiner

*Primary Examiner* — Amir Zarabian
*Assistant Examiner* — Minh Dinh
(74) *Attorney, Agent, or Firm* — Lowenstein Sandler LLP

(57) ABSTRACT

A memory sub-system with a memory device having a plurality of cells, and the plurality of cells having a set of cells, and a processing device operatively coupled to the memory device, the processing device to perform operations of determining a level information associated with the set of cells, where the set of cells comprise a target cell associated with a read operation, identifying a read level offset for the target cell based on the level information, and performing the read operation in accordance with the read level offset.

20 Claims, 8 Drawing Sheets

200

```
┌─────────────────────────────────────────────────┐
│ DETERMINE A LEVEL INFORMATION ASSOCIATED WITH A │
│ SET OF CELLS, WHEREIN THE SET OF CELLS COMPRISE A│
│ TARGET CELL ASSOCIATED WITH A READ OPERATION    │
│                      210                         │
└─────────────────────────────────────────────────┘
                        │
                        ▼
┌─────────────────────────────────────────────────┐
│ IDENTIFY A READ LEVEL OFFSET FOR THE TARGET CELL │
│         BASED ON THE LEVEL INFORMATION           │
│                      220                         │
└─────────────────────────────────────────────────┘
                        │
                        ▼
┌─────────────────────────────────────────────────┐
│ PERFORM THE READ OPERATION IN ACCORDANCE WITH   │
│            THE READ LEVEL OFFSET                 │
│                      230                         │
└─────────────────────────────────────────────────┘
```

FIG. 2

SELF-OPTIMIZING CORRECTIVE READ OFFSETS WITH LATERAL CHARGE MIGRATION PROXIES

RELATED APPLICATION

This application claims the benefit of U.S. Provisional Application No. 63/438,442, filed Jan. 11, 2023, the entire contents of which are hereby incorporated by reference.

TECHNICAL FIELD

Embodiments of the disclosure relate generally to memory sub-systems, and more specifically, relate to self-optimizing corrective read offsets with lateral charge migration proxies in a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates a flow diagram of an example method to self-optimize a corrective read offset through lateral charge migration proxies, in accordance with some embodiments of the present disclosure.

DETAILED DESCRIPTION

Figure 1A:
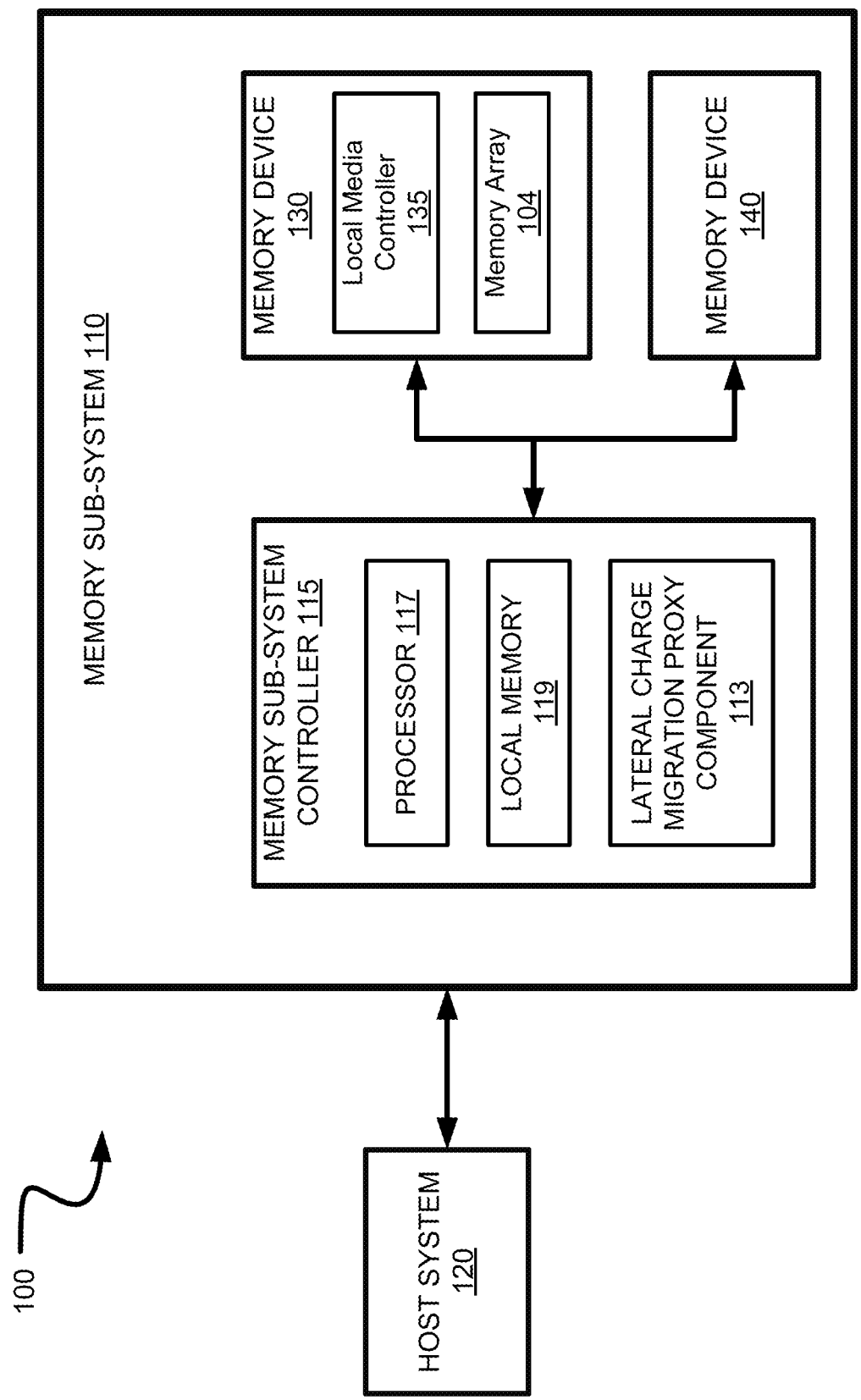
FIG. 1A illustrates an example computing system that includes a memory sub-system in accordance with some embodiments of the present disclosure.

Aspects of the present disclosure are directed to self-optimizing corrective read offsets with lateral charge migration proxies in a memory device of a memory sub-system. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1A. A non-volatile memory device is a package of one or more dies. Each die may include one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

A memory cell ("cell") can be programmed (written to) by applying a certain voltage to the cell, which results in an electric charge being held by the cell. For example, for each individual cell (having a charge Q stored thereon) the certain voltage applied can be a threshold control voltage $V_T$ (also referred to as the "threshold voltage"). One type of cell is a single level cell (SLC), which stores 1 bit per cell and defines 2 logical states ("states") ('1' or "L0" and '0' or "L1") each corresponding to a respective $V_T$ level. For example, the '1' state can be an erased state and the '0' state can be a programmed state L1. Another type of cell is a multi-level cell (MLC), which stores 2 bits per cell and defines 4 states ('11' or "L0," '10' or "L1," '01' or "L2," and '00' or "L3") each corresponding to a respective $V_T$ level. For example, the '11' state can be an erased state and the '01,' '10,' and '00' states can each be a respective programmed state. Another type of cell is a triple level cell (TLC), which stores 3 bits per cell and defines 8 states L0-L7, where L0 corresponds to '111' and L7 corresponds to '000,' with each state corresponding to a respective $V_T$ level. For example, the '111' state can be an erased state and each of the other states can be a respective programmed state. Another type of a cell is a quad-level cell (QLC), which stores 4 bits per cell and defines 16 states L0-L15, where L0 corresponds to '1111' and L15 corresponds to '0000.' Another type of cell is a penta-level cell (PLC), which stores 5 bits per cell and defines 32 states. Other types of cells are also contemplated. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of cells.

Some non-volatile memory devices can use a demarcation voltage (e.g., a read reference voltage) to read data stored at memory cells. For example, in a read operation, a read reference voltage can be applied to a target cell. If a threshold voltage ($V_T$) of the target memory cell is identified as being below the applied read reference voltage, then the data stored at the target cell can be read as a particular value (e.g., a logical '1') or determined to be in a particular state (e.g., a "set" state). If the threshold voltage of the specified memory cell is identified as being above the read reference voltage, then the data stored at the specified memory cell can be read as another value (e.g., a logical '0') or determined to be in another state (e.g., a "reset" state). A given level for a set of cells may have a range of threshold voltages (e.g., such as a normal distribution of threshold voltages). Thus, the read reference voltage can be applied to memory cells to determine values stored at the memory cells.

Some memory devices can be subject to physical phenomena that affect the charge stored in their cells (e.g., charge loss) and consequently, also affect the respective threshold voltages of the cells. These phenomena can arise in a memory array between one or more specified cells and their respective groups of adjacent cells. Examples of such phenomena include slow charge loss "SCL," intrinsic charge loss "ICL," and lateral charge migration "LTM" (e.g., charge migration between adjacent cells). These physical phenomena can lead to significant $V_T$ shifts in the target cell or set of cells. For example, the shift can be sufficient to cause a memory access operation performed on the target cell to result in a determined sensed state other than the one associated with the programming level of the target cell (e.g., a programmed logical '1' state can instead be determined to be a logical '0' state, etc.). Consequently, these physical phenomena can cause a lowering and widening of the $V_T$ distribution associated with a given programming level, (e.g., L1, L2, etc.), and impair the ability to accurately read values from the given programming level.

In some situations, charge loss in a cell can be mitigated by a voltage compensation during read operations or programming (e.g., write) operations that are performed on the cells of the memory device. More specifically, adjustments can be made to voltages applied to a cell in the course of read operations and write operations to compensate for the multiple shifted $V_T$ sub-distributions created due to the effects of corresponding programming levels of one or more adjacent cells (e.g., "aggressor" cells). These adjusted voltages (e.g., a read reference voltage or a program-verify voltage) applied in the course of such memory access operations can be offset (e.g., in an opposite direction) relative to the $V_T$ of a specified cell to counteract the effects of charge loss. Shifting or aligning the means (e.g., averages) of the $V_T$ distributions through voltage adjustments of a given programming level's $V_T$ distribution can compensate for the widening of the overarching $V_T$ distribution of the given programming level.

In some implementations, when an error is encountered during a read operation (e.g., a hard read failure) with respect to a memory cell (e.g., a target cell), or when a bit error rate (BER) with respect to multiple cells is exceeded, a sequence of error handling operations (or sequence of recovery steps) can be undertaken. This sequence can include performing a corrective read operation. A corrective read operation can include applying one or more adjusted (e.g., compensated) read reference voltages (e.g., voltages offset from a default read reference voltage) to determine the programming state of the target cell (depending on the programming level of an adjacent aggressor cell).

However, a corrective read operation can be a resource intensive approach, depending on the number of additional operations needed to determine the modified parameters (e.g., voltage adjustments) to determine a voltage adjustment for a given programming level (e.g., read level offset). Compensation operations can lead to increased time (e.g., read time) needed to complete respective corrective read operations, and can significantly delay the transmission of data to the host device. Additionally, some operations that compensate for charge loss phenomena (e.g., SCL, ICL, and/or lateral charge migration) might not be effective in practically improving a desired performance metric (e.g., an increase in reliability, such as a decreased BER, etc.).

Due to processing and/or operating conditions, the threshold voltages $V_T$ can be different for cells implemented on the same die. The $V_T$ of a set of cells can be characterized by a distribution P of the threshold voltages $P(Q, V_T)=dW/dV_T$, where dW represents the probability that any given cell has its threshold voltage within the interval $[V_T, V_T+dV_T]$ when charge Q is placed on the cell. A memory device can exhibit threshold voltage distributions $P(Q, V_T)$ that are narrow compared with the working range of control voltages tolerated by the cells of the device. Multiple non-overlapping $P(Q_k, V_T)$ ("valleys") can be fit into the working range allowing for storage and reliable detection of multiple values of the charge $Q_k$, k=1, 2, 3 . . . etc. The distributions (valleys) can be interspersed with voltage intervals ("valley margins"). A valley margin hereinafter can be used to refer to a voltage, or set of voltages that do not correspond to a $V_T$ of a cell or cell level (e.g., the "voltage gaps" between levels such as between L0 and L1, between L1 and L2, etc.). Valley margins can be used to separate various charge states $Q_k$ (e.g., levels). The logical state of the cell can be determined by detecting during a memory operation which valley margin is directly below a cell or level $V_T$, and which valley margin is directly above a cell or level $V_T$ (e.g., by detecting which valley margins satisfy Valley-Margin$_1$<$V_T$<Valley-Margin$_2$). For example, a read operation can be performed by comparing the measured threshold voltage $V_T$ exhibited by the cell to one or more reference voltage levels corresponding to known valley margins (e.g., centers of the valley margins) of the memory device in order to distinguish between multiple logical programming levels and determine the programming state of the cell.

A valley margin can also be referred to as a read window. For example, in a SLC cell, there is 1 read window with respect to the 2 $V_T$ distributions. Analogously, in an MLC cell, there are 3 read windows with respect to the 4 $V_T$ distributions. Similarly, in a TLC cell, there are 7 read windows with respect to the 8 $V_T$ distributions. Read window sizes can generally decrease as the number of states increases. For example, the 1 read window budget for the SLC cell be larger than each of the 3 read windows for the MLC cell, and each of the 3 read windows for the MLC cell can be larger than each of the 7 read windows for the TLC cell, etc. In some embodiments, a $V_T$ distribution can also be referred to as a state-width. In some embodiments, a portion of a $V_T$ distribution can also be referred to as a state-width. For example, in an SLC cell, one state-width (e.g., $V_T$ distribution for L0) can exist between the lower $V_T$ boundary for the set of memory cells and the 1 read window (e.g., valley margin), and a second state-width (e.g., $V_T$ distribution for L1) can exist between 1 read window (e.g., valley margin) and the upper $V_T$ boundary for the set of memory cells. Read window budget (RWB) refers to the cumulative value of the read windows. An auto read calibration (ARC) algorithm can determine a valley center when performing a read operation. For example, an ARC read operation can be executed to identify where an optimal or ideal read level can be with a valley associated with a programming level distribution. In this regard, a discrete command can be issued, and corresponding ARC operations can be executed to identify the read voltage level corresponding to the center of a given valley.

Cells or segments that are to be read during a read operation can be referred to as specified cells (e.g., "target cells," "target segments," etc.). The target cell can be connected to a target wordline, and can neighbor an adjacent cell connected to an adjacent wordline. In some situations, the neighboring, or adjacent cell or wordline may be an "aggressor" wordline which can negatively impact the $V_T$ of a "victim" cell or wordline (e.g., a target cell or wordline).

Charge loss through physical phenomena such as SCL or ICL can occur due to the programmed state of a given cell and given cell's program erase (P/E) cycle. Effects from SCL and ICL can be programming level dependent, and can depend on the electric field across the cell stack during data retention (e.g., in a QLC segment, SCL and ICL can have a smaller effect on $V_T$ shift at lower levels such as L1 and L2, but a larger effect on $V_T$ shift at higher levels such as L14 and L15, etc.). Retention (also hereinafter referred to as "bake") can refer to an amount of lapsed time since a cell has been programmed (e.g., bake or a retention period may be used to describe that the time elapsed since initial programming of a cell has surpassed a threshold). "Pre-bake" cells (or segments, etc.) can refer to cells shortly after being programmed, and before the cells have gone through the retention period. "Post-bake" cells (or segments, etc.) can refer to cells after they have gone through a retention period. "Baking" and retention can also correspond to certain temperature thresholds associated with the retention time.

Charge loss through physical phenomena such as lateral charge migration can occur as electrons diffuse laterally (e.g., along the wordline) from the charge storage structure of an adjacent (e.g., aggressor) cell towards the storage structure(s) of the target cell by tunneling through intervening layers between the respective storage structures. This charge diffusion can depend on the respective programming level of neighboring cells connected to the same bitline as the target cell. Lateral migration of charge from an adjacent cell on the wordline can also shift the $V_T$ of the target cell due to the loss of charge (e.g., electrons) that were previously present. Effects from lateral charge migration can be programming level dependent (e.g., the lower the programming level, the higher the effects from lateral charge migration). Because SCL and ICL are level dependent (e.g., dependent on the electric field across the cell tack during data retention), SCL and ICL contribute less to charge loss at lower levels (e.g., L1, L2, etc.) than lateral charge migration, and therefore charge loss (e.g., state-width widening) is dominated by lateral charge migration and can be used as a proxy for lateral charge migration and corrective-read offset calibration.

In some situations, adjustments to the voltages applied during a memory cell access operation can compensate for charge loss from lateral charge migration, SCL, and/or ICL. Various factors (e.g., parameters) may control the type and amount of voltage adjustment for a given level. Some factors can include: (i) the geometry of the array of memory cells; (ii) the sensitivity of a victim memory cells to an aggressor cell state; (iii) the programming level of a victim cell; (iv) the programming level of an aggressor cell; (v) the desired (e.g., target) RWB; (vi) the amount (e.g., in bits) of information about the aggressor cell programming levels that is to be used; (vii) the amount of energy used; and/or (viii) the amount of time used can each determine how a memory cell access operation is modified to compensate for the cell-to-cell coupling and lateral migration effects. Default parameters of a memory operation (e.g., a read or write operation) can be modified (e.g., "tailored," by adjusting the applied voltages) to achieve a desired set of $V_T$ sub-distributions for a set of levels in a memory cell. In some situations, the modification of these parameters can depend on determining the programming levels of the target cell (e.g., the "victim" cell) and one or more neighboring cell(s) (e.g., aggressor cells). For example, in some implementations, an aggressor wordline can be used to determine the modifications to the default parameters that will achieve a desired read from a victim cell or wordline. Occasionally, more than one aggressor wordline can be used to improve the accuracy of the parameter modifications. Each additionally included aggressor wordline can improve the accuracy of adjustments to the default parameters at the expense of additional complexity (e.g., increased energy consumption and processing time) to the tailoring operation. While performing a complex tailoring operation with multiple aggressor wordlines can be accurate, the increased complexity can negatively impact system performance and the quality of service provided by the memory sub-system.

Aspects of the present disclosure address the above and other deficiencies by enabling self-optimizing corrective read offsets through lateral charge migration proxies to compensate for lateral migration effects on a target cell or victim wordline. Embodiments described herein describe voltage compensation techniques for charge migration across memory device or segment variations such as retention time, P/E cycle counts, wordline groups (WGR), and varying die characteristics, with minimal added complexity.

In some embodiments, during a retention period (e.g., an elapsed time since a memory cell or segment has been programmed, also referred to as a "bake") certain information about a level (e.g., a level state-width, or level shift) can correspond to a corrective read offset calibration (e.g., the parameters affecting voltage compensation adjustments). In some embodiments, level information can act as a proxy (e.g., stand-in approximation) for lateral charge migration (e.g., the values of a level information can correspond to a lateral charge migration quantity, and thus a certain read level offset).

In some embodiments, one or more parameters can map the level information to a read reference voltage compensation (e.g., read level offset). In some embodiments, additional processing logic and/or parameters may determine the amount of voltage compensation to be applied to a read reference voltage for a target cell or memory segment. In many embodiments, the state information can reflect the effects that aggressor cells or wordlines have on the target cell (e.g., the state information can serve as a proxy for charge loss such as lateral charge migration). In many embodiments, using the state information to determine the read level offset can reduce the complexity of corrective read operations, (including corrective read operations which can include multiple aggressor wordlines) while maintaining a high level of accuracy at a low resource cost when compared to corrective read operations which rely on one or more aggressor wordlines to determine voltage compensation for a corrective read. Further details regarding this process are described with reference to FIGS. 2-6.

In some embodiments, the level information can include a level state-width (e.g., a $V_T$ probability distribution of a given level across a set of cells, or portion of the $V_T$ distribution). In some embodiments, the level state-width can be determined by a first and second strobe to the level (e.g., "L1"). In some embodiments, two parameters (e.g., memory trims) can map the state-width to a corresponding read level offset. In some embodiments, the state-width can be determined for the lowest programmable level (e.g., L1) of a cell, where effects from lateral charge migration can be strongest. Further details regarding this process are described with reference to FIGS. 3 and 5.

In some embodiments, the level information can include a level shift (e.g., a voltage amount that the mean of a $V_T$ distribution of a given level across a set of cells has shifted) corresponding to a retention period (e.g., "bake"). In some embodiments, two parameters (e.g., memory trims) can map the level shift at a given P/E cycle count associated with a given wordline group to a corresponding read level offset. In some embodiments, an auto read calibration (ARC) algorithm can be performed prior to a corrective read operation. In some embodiments, the level shift of a given level may be determined by the ARC algorithm. In some embodiments, the level shift of a highest programmable level (e.g., L15 in a QLC) may be determined where effects from SCL/ICL can be strongest. Further details regarding this process are described with reference to FIGS. 4 and 6.

Advantages of the embodiments of the present disclosure include, but are not limited to improved memory performance and reliability at a reduced complexity, compensation for charge movement due to retention time, P/E cycles, wordline group variability, and varying die characteristics. Another advantage is providing performance and reliability gains approaching a theoretical infinite wordline aggressor implementation without the similar increase to complexity. FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a lateral charge migration proxy component 113 that can self-optimize a corrective read offset through lateral charge migration proxies. In some embodiments, the memory sub-system controller 115 includes at least a portion of the lateral charge migration proxy component 113. In some embodiments, the lateral charge migration proxy component 113 is part of the host system 120, an application, or an operating system. In other embodiments, local media controller 135 includes at least a portion of lateral charge migration proxy component 113 and is configured to perform the functionality described herein.

The lateral charge migration proxy component 113 can include processing logic to self-optimize a corrective read offset through lateral charge migration proxies. Lateral charge migration proxy component 113 can determine a voltage compensation to be applied to a default read reference voltage such that memory sub-system 110 can accurately read the stored logical state(s) of a target memory cell as originally programmed. Lateral charge migration proxy component 113 can determine a level information of a target cell. Lateral charge migration proxy component 113 can store pre-calibrated values which correspond to given level information. With the stored pre-calibrated values, lateral charge migration proxy component maps (e.g., identifies) a given level information to a read level offset. Memory sub-system 110 can activate lateral charge migration proxy component 113 after a failed read occurs. In some embodiments, either memory sub-system controller 115 or local media controller 135 can activate lateral charge migration proxy component 113. In some embodiments, after a failed read, processing logic can attempt to re-read the failed cells before activating lateral charge migration proxy component 113. In some embodiments, after a failed read, processing logic can implement an auto read calibration (ARC) before activating lateral charge migration proxy component 113. In many embodiments, lateral charge migration proxy component 113 is a part of a corrective read operation. In some embodiments, lateral charge migration proxy component 113 can implement and/or replace the default corrective read operation of memory sub-system 110. In some embodiments, processing logic can implement a corrective read operation after lateral charge migration proxy component 113 has completed its processing operations. In some embodiments, lateral charge migration proxy component 113 can implement a corrective read operation as a part of its processing operations.

Lateral charge migration proxy component 113 can access a database or other data structure to store the pre-calibrated values and/or to store identified level information. In some embodiments, more than one database can be included on, or associated with, lateral charge migration proxy component 113, and each database can be associated with a different value type (e.g., a database for parameters, a database for pre-calibrated values, a database for storing identified level information, etc.). In some embodiments, the database that can be included in, or associated with, lateral charge migration proxy component 113 can be read-only. In some embodiments, the database can be read-write. In some embodiments, processing logic on lateral charge migration proxy component 113 can dynamically update entries in the database based on on-device conditions (e.g., such as temperature, retention time, program/erase "P/E" cycle count, wordline group, die, etc.) and/or memory operations (e.g., read operations, write operations, etc.) In some embodiments, the database can correspond to a memory die, semiconductor material or manufacturing process, and/or other physical characteristics of the memory device where the target cell is physically located. For example, a P/E cycle count for the memory device or a memory segment can be stored in the database, and processing logic can update the P/E cycle count concurrent with program and erase operations performed on the memory device or segment. Further details with regards to the operations of the lateral charge migration proxy component 113 are described below.

Figure 1B:
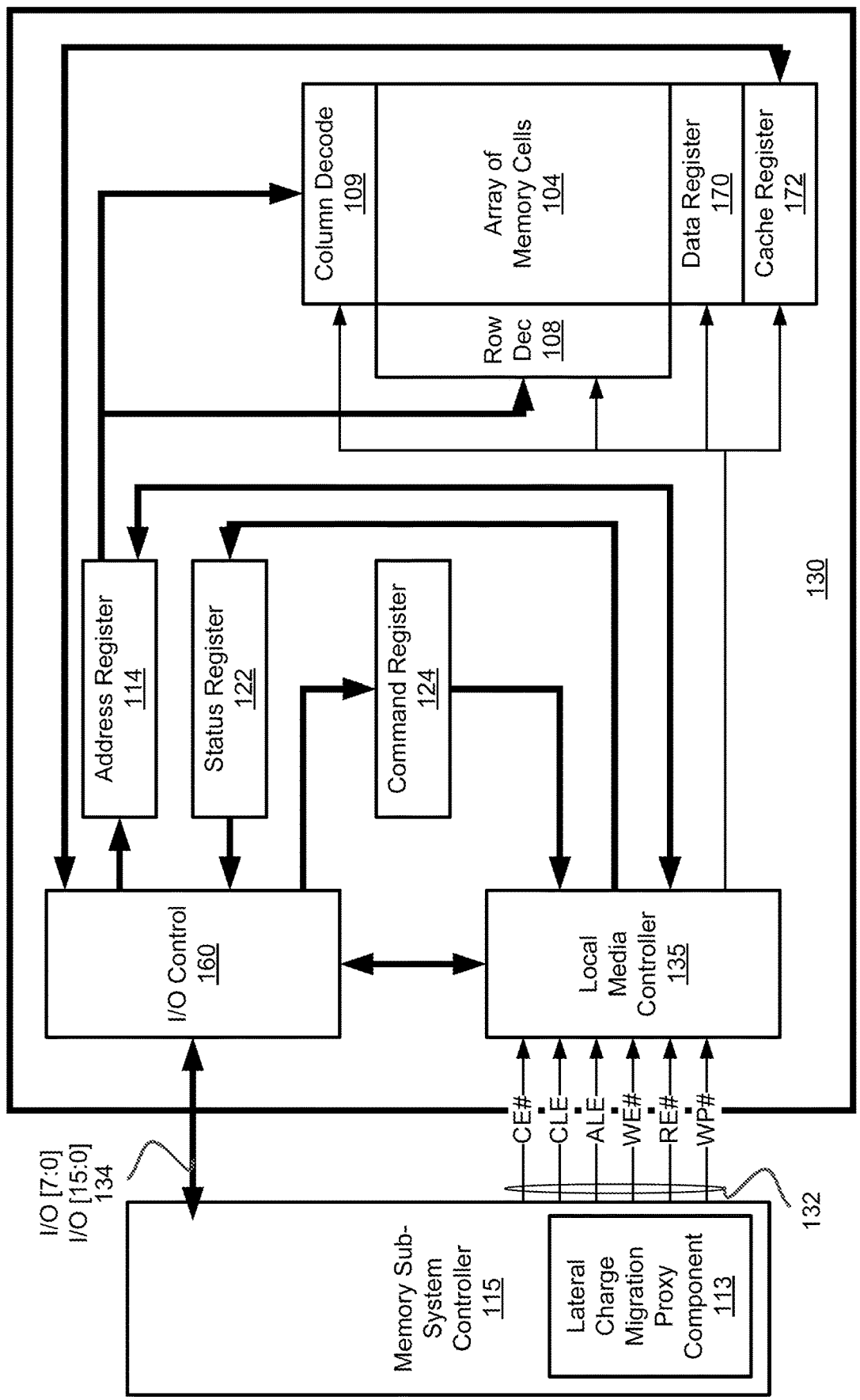
FIG. 1B illustrates an example block diagram of a memory device in communication with a memory sub-system controller of a memory sub-system, in accordance with some embodiments of the present disclosure.

FIG. 1B illustrates an example simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device. The memory sub-system controller 115 can include the lateral charge migration proxy component 113.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line can be associated with more than one logical row of memory cells and a single data line can be associated with more than one logical column. Memory cells (not shown in FIG. 1B) of at least a portion of array of memory cells 104 are capable of being programmed to one of at least two target data states. In one embodiment, the array of memory cells 104 (i.e., a "memory array") can include a number of sacrificial memory cells used to detect the occurrence of read disturb in memory device 130, as described in detail herein.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115. That is, the local media controller 135 is configured to perform access operations (e.g., read operations, programming operations, and/or erase operations) on the array of memory cells 104. The local media controller 135 is in communication with row decode circuitry 108 and column decode circuitry 109 to control the row decode circuitry 108 and column decode circuitry 109 in response to the addressing commands.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data can be passed from the cache register 172 to the data register 170 for transfer to the array of memory cells 104; then new data can be latched in the cache register 172 from the I/O control circuitry 160. During a read operation, data can be passed from the cache register 172 to the I/O control circuitry 160 for output to the memory sub-system controller 115; then new data can be passed from the data register 170 to the cache register 172. The cache register 172 and/or the data register 170 can form (e.g., can form a portion of) a page buffer of the memory device 130. A page buffer can further include sensing devices (not shown in FIG. 1B) to sense a data state of a memory cell of the array of memory cells 104, e.g., by sensing a state of a data line connected to that memory cell. A status register 122 can be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal (CE #), a command latch enable signal (CLE), an address latch enable signal (ALE), a write enable signal (WE #), a read enable signal (RE #), and a write protect signal (WP #). Additional or alternative control signals (not shown) can be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands can be received over input/output (I/O) pins [7:0] of I/O bus 134 at I/O control circuitry 160 and can then be written into command register 124. The addresses can be received over input/output (I/O) pins [7:0] of I/O bus 134 at I/O control circuitry 160 and can then be written into address register 114. The data can be received over input/output (I/O) pins [7:0] for an 8-bit device or input/output (I/O) pins [15:0] for a 16-bit device at I/O control circuitry 160 and then can be written into cache register 172. The data can be subsequently written into data register 170 for programming the array of memory cells 104.

In an embodiment, cache register 172 can be omitted, and the data can be written directly into data register 170. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) can be used in the various embodiments.

FIG. 2 illustrates a flow diagram of an example method 200 to self-optimize a corrective read offset through lateral charge migration proxies, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, hardware and software can be operatively coupled to perform method 200. In some embodiments, the method 200 is performed by the lateral charge migration proxy component 113 of FIGS. 1A-B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other flows are possible.

At operation 210, the processing logic determines a level information associated with a set of cells, wherein the set of cells comprises a target cell associated with a read operation. In some embodiments, level information can be a state-width (e.g., voltage threshold $V_T$ distribution, or portion of a $V_T$ distribution) of a memory state within a level such as an "L0," "L1," etc., as described above. Determining a corrective read level offset voltage adjustments based on state-width level in information is further described with respect to FIGS. 3 and 5. In some embodiments, level information can be a read level shift from a pre-bake read level to a post-bake read level (e.g., the voltage difference between a pre-bake read level and a post-bake read level for the same level/cell). Pre-bake refers to read level at the time of programming (or shortly thereafter), while post-bake refers the read level after an amount of time has elapsed. Determining corrective read level offset voltage adjustments based on read level shift information is further described with respect to FIGS. 4 and 6. In some embodiments, processing logic can implement operation 210 in response to a read request (e.g., in response to receiving a read request from a host for a memory segment, etc.).

In some embodiments, the set of cells can include all memory cells in a memory device. In some embodiments, the set of cells can correspond to one or more wordlines. In some embodiments, the set of cells can correspond to one or more individual cells. In some embodiments, the set of cells can correspond to unconnected memory segments (e.g., not physically connected or organized, such as specific wordlines from two or more wordline groups, etc.). In some embodiments, the processing logic can associate two or more target cells with a read operation. In some embodiments, processing logic can store the level information in a database (e.g., the database described with respect to FIGS. 2-4).

At operation 220, the processing logic identifies a read level offset for the target cell based on the level information. In some embodiments, processing logic can store the read level offset in a database (e.g., the database described with respect to FIGS. 2-4. In some embodiments, processing logic can update read level offsets stored in the database. In some embodiments, one or more parameters can correspond to a given read level offset. In some embodiments, the parameter(s) can be stored in a parameters database. In some embodiments, processing logic can identify (e.g., read) stored values. In some embodiments, processing logic can update (e.g., write) parameters stored in the database. In some embodiments, the database can contain relational metrics (e.g., comparator operations such as simple multipliers, etc.) to map a state information value to a correlated read level offset. In some embodiments, the database can be populated with pre-calibration values. In at least one embodiment, the database can include values which were pre-calibrated during production of the memory device. In some embodiments, processing logic can identify the read level offset parameters from the database.

In some embodiments, processing logic can be used to identify the read level offset. In some embodiments, identifying the read level offset can include processing logic to identify a read operation type, identify a set of trims associated with the read operation type, and identify one or more trims associated with the level information. In some embodiments, the read operation type can be a read calibration operation. In some embodiments, the read operation type can be a corrective read operation. In some embodiments, the corrective read operation can include one or more parameters for adjusting a default read operation and can counteract the effects of one or more aggressor wordlines on the set of cells. In at least one embodiment, the corrective read operation can include several (e.g., three or more) parameters (e.g., bit-masked aggressor wordlines).

At operation 230, the processing logic performs the read operation in accordance with the read level offset. In some embodiments the read operation can be performed on a target cell. In some embodiments, the read operation can be performed on the set of cells containing the target cell. In some embodiments, the read operation can be performed on another cell within the set of cells containing the target cell that is not the target cell. In some embodiments, processing logic can use the read level offset of operation 230 to perform read operations on other memory cells or segments which may not be associated (e.g., logically, or physically) with the memory cells from operations 210 and 220 respectively. In some embodiments, the processing logic can perform operations 210-220 on a segment of memory or set of cells, and apply the read level offset (e.g., as in operation 230) universally across the memory device when performing read operations. In some embodiments, the processing device can designate a cell of the memory device or segment as "the target cell" and can perform operations 210 and 220 on "the target cell," and perform operation 230 on one or more unrelated (e.g., logically, or physically) segments of the memory device (which can include a set of cells, or even all of the cells within a memory device). In some embodiments, processing logic can perform operation 230 in response to completing operation 220 (e.g., processing logic can perform the read operation responsive to identifying the read level offset).

Figure 3:
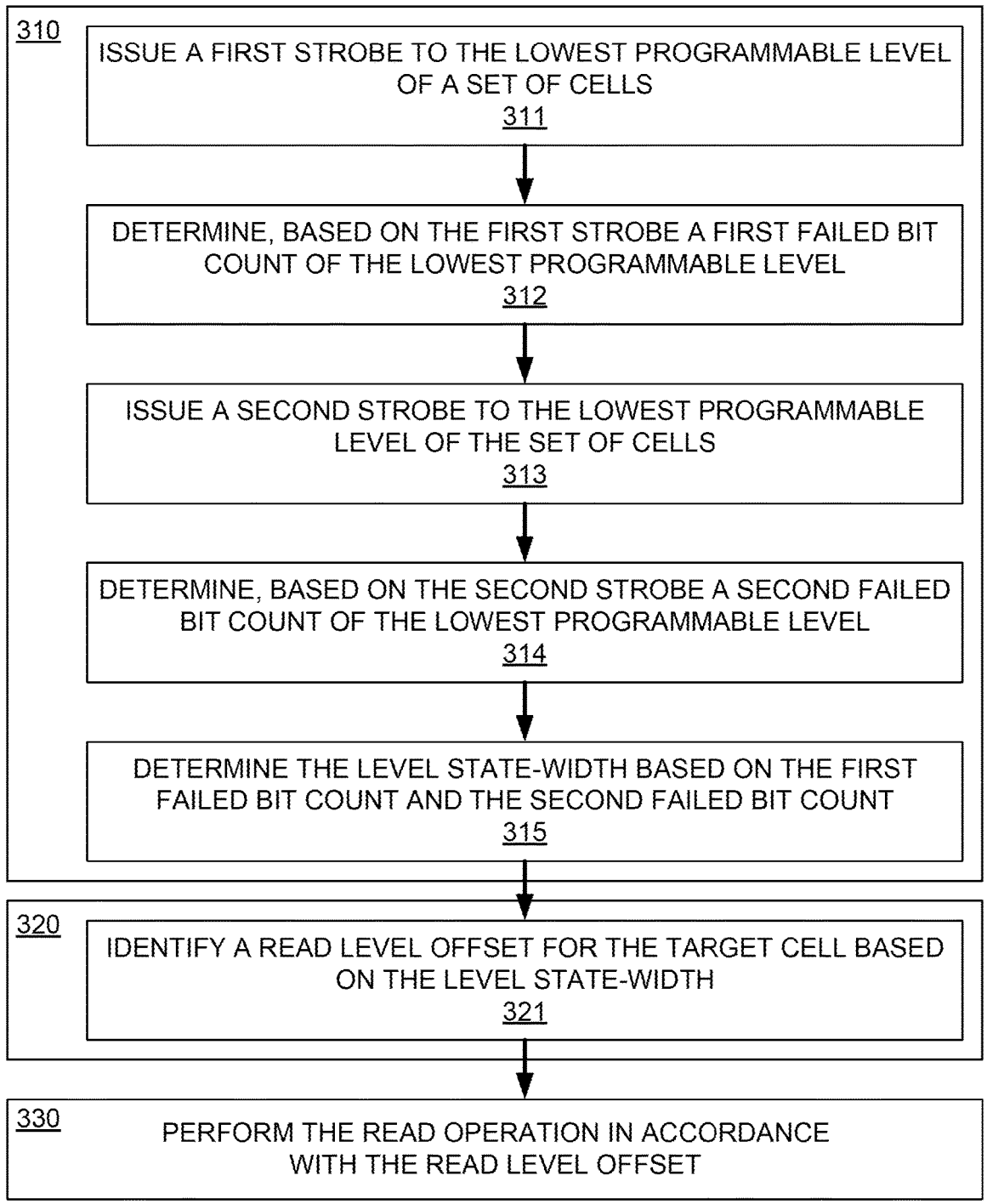
FIG. 3 illustrates a flow diagram of an example method to determine corrective read level offset voltage adjustments through lateral charge migration proxies in state information such as a state-width, in accordance with some embodiments of the present disclosure.

FIG. 3 illustrates a flow diagram of an example method 300 to determine corrective read level offset voltage adjustments through lateral charge migration proxies in state information such as a state-width, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the lateral charge migration proxy component 113 of FIGS. 1A-B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other flows are possible.

In most embodiments, operation 310 can be one example of operation 210 as described with respect to FIG. 2, albeit with additional sub-operations 311, 312, 313, 314, and 315. In most embodiments, operation 320 can be one example of operation 220 as described with respect to FIG. 2, albeit with additional sub-operation 321. In most embodiments, operation 330 can be one example of operation 230 as described with respect to FIG. 2. In some embodiments, memory operations performed by processing logic can include operations such as read operations, erase operations, and write operations, etc.

At operation 311, the processing logic issues a first strobe to the lowest programmable level of a set of cells. In some embodiments, the set of cells include a target cell. In some embodiments, the set of cells can be associated with a memory operation being performed by the processing logic. In some embodiments, processing logic can identify or select more than one set of cells as part of a memory operation. In some embodiments, the lowest programmable level can experience the smallest intrinsic $V_T$ shift of the programmable levels (e.g., the $V_T$ shift of the lowest programmable level, such as "L1" can shift less than the $V_T$ distribution of a higher programmable level, such as "L2," etc.). In some embodiments, a majority of margin degradation (e.g., read window budget degradation) at low programmable levels (e.g., the lowest programmable level, or L1) can come from state-width widening (e.g., when compared to other charge loss phenomena such as ICL and/or SCL which can also contribute to state-width widening).

In some embodiments, the first strobe can have a fixed voltage. In some embodiments, the fixed voltage can correspond to a memory die, semiconductor material or manufacturing process, and/or other physical characteristics of the memory device where the set of cells are located. In some embodiments, the first strobe can correspond to a lower boundary of the threshold voltage distribution ($V_T$) of the lowest programmable level for the set of cells. In some embodiments, the first strobe can correspond to a read reference voltage for the lowest programmable level. In some embodiments, the first strobe can have a smaller (e.g., less than) voltage magnitude than the magnitude of the read reference voltage of the lowest programmable level. In some embodiments, the first strobe can be pre-calibrated. In some embodiments, processing logic can store a value (e.g., magnitude, such as voltage differential) of the first strobe in a database. In some embodiments, processing logic can alter (e.g., write) the value of the first strobe. In some embodiments, the first strobe can have a fixed value, and processing logic might be unable to alter the value of the first strobe (e.g., read-only).

In some embodiments, the lowest programmable level can correspond to a "level 1," of a cell (e.g., such as an "L1" of an SLC, an MLC, a TLC, a QLC, or a PLC, etc.). In some embodiments, the lowest programmable level can correspond to a "level 0," such as an "L0" of a memory cell. In some embodiments, processing logic can reserve the cell level(s) below the lowest programmable level (e.g., such as reserving "L0" as an erase, or "reset" state). In some embodiments, the lowest programmable level can correspond to the lowest programming voltage threshold window (e.g., $V_T$ distribution) at which the processing device can store (and retrieve) a value.

At operation 312, the processing logic determines, based on the first strobe, a first failed bit count of the lowest programmable level. In some embodiments, the first failed bit count can correspond to a number of failed bits in the set of cells (e.g., such as a BER or RBER for the memory segment or set of cells) for a first given voltage (e.g., such as the voltage of "first strobe" described above with respect to operation 311). In some embodiments the first failed bit count can correspond to a lowest readable voltage of the level (e.g., the lowest voltage at which processing logic can reliably or consistently detect a stored logic state, such as a '0,' or '1').

At operation 313, the processing logic issues a second strobe to the lowest programmable level of the set of cells. In some embodiments, the second strobe can have a fixed voltage. In some embodiments, the fixed voltage of the second strobe can be different from the fixed voltage of the first strobe. In some embodiments, the fixed voltage can correspond to a memory die, semiconductor material or manufacturing process, and/or other physical characteristics of the memory device where the set of cells are located. In some embodiments, the second strobe can correspond to an upper boundary of the threshold voltage distribution ($V_T$) of the lowest programmable level for the set of cells. In some embodiments, the second strobe can correspond to a read reference voltage for the lowest programmable level. In some embodiments, the second strobe can have a larger (e.g., greater than) voltage magnitude than the magnitude of the read reference voltage of the lowest programmable level. In some embodiments, the second strobe can be pre-calibrated. In some embodiments, a value (e.g., magnitude, such as voltage differential) of the second strobe can be stored in a database. In some embodiments, processing logic can alter (e.g., write) the value of the second strobe. In some embodiments, the second strobe can have a fixed value, and processing logic might be unable to alter the value of the second strobe (e.g., read-only).

At operation 314, the processing logic determines, based on the second strobe, a second failed bit count of the lowest programmable level. In some embodiments, the second failed bit count can correspond to a number of failed bits in the set of cells (i.e., the same set of cells as described above with respect to operations 312 and 313) for a second given voltage (e.g., such as the voltage of "second strobe" described above with respect to operation 313). In some embodiments the second failed bit count can correspond to a highest readable voltage of the level (e.g., the highest voltage at which processing logic can reliably or consistently detect a stored logic state, such as a '0,' or '1').

At operation 315, the processing logic determines the level state-width of the lowest programmable level based on the first failed bit count and the second failed bit count. In some embodiments, the level state-width can correspond to the first failed bit count at the first strobe, and the second failed bit count at the second strobe. In some embodiments, processing logic can compare the first failed bit count and the second failed bit count with an initial or expected (e.g., based on the design of the memory device or die) first failed bit count and second failed bit count. In some embodiments, the initial or expected first failed bit count and second failed bit count can be predetermined during production of the memory device. In some embodiments, the initial or expected first failed bit count and second failed bit count can be stored in a table associated with a memory sub-system controller, such as memory sub-system controller 115 as described with respect to FIG. 1A. For example, in some embodiments, the first failed bit count at the first strobe voltage can correspond to one input to a pre-characterized state-width table, and the second failed bit count at the second strobe voltage can correspond to a second input to the pre-characterized state-width table. In some embodiments, the first failed bit count can correspond to one boundary of a read window for a level (e.g., a lower boundary) and the second failed bit count can correspond to another boundary of the read window (e.g., an upper boundary).

At operation 321, the processing logic identifies a read level offset for a target cell based on the level state-width. In some embodiments, the set of cells described with respect to operations 311, 312, 313, and 314 can include the target cell. In some embodiments, one or more parameters (e.g., memory trims) can correspond to a given state-width, and the one or more parameters can be stored in a database. In at least one embodiment, a database entry can contain a parameter corresponding to a first failed bit count, and a second parameter corresponding to a second failed bit count.

At operation 330, the processing logic performs the read operation in accordance with the read level offset. In some embodiments, the read level offset can correspond to a voltage compensation for a given level. In some embodiments, processing logic can adjust the read reference voltage by a voltage equal to the read level offset. In some embodiments processing logic can perform the read operation on the target cell. In some embodiments, processing logic can perform the read operation on the set of cells that include the target cell. In some embodiments, processing logic can perform the read operation on a memory segment which may not be associated (logically or physically) with the target cell or the set of cells.

Figure 4:
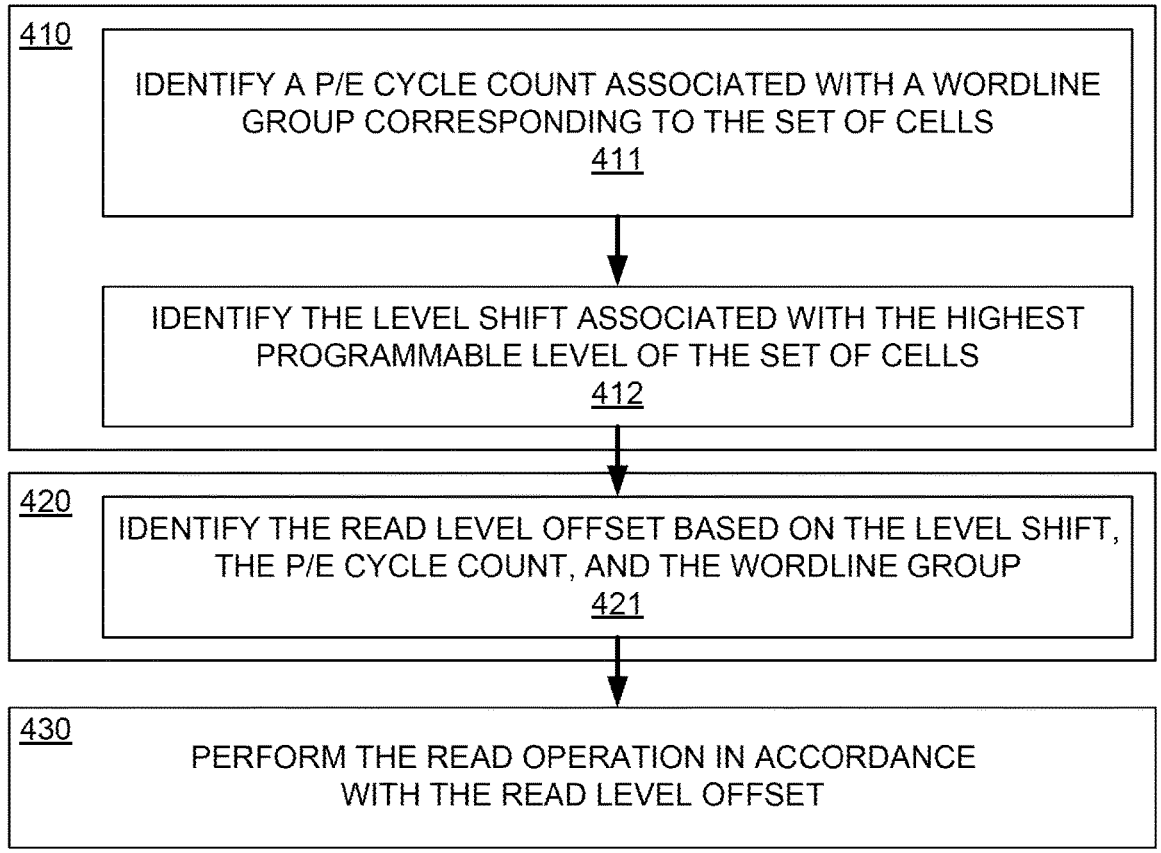
FIG. 4 illustrates a flow diagram of an example method to determine corrective read level offset voltage adjustments through lateral charge migration proxies in state information such as a read level shift, in accordance with some embodiments of the present disclosure.

FIG. 4 illustrates a flow diagram of an example method 400 to determine corrective read level offset voltage adjustments through lateral charge migration proxies in state information such as a read level shift, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the lateral charge migration proxy component 113 of FIGS. 1A-B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other flows are possible.

In most embodiments, operation 410 can be one example of operation 210 as described with respect to FIG. 2, albeit with additional sub-operations 411 and 412. In most embodiments, operation 420 can be one example of operation 220 as described with respect to FIG. 2, albeit with additional sub-operation 421. In most embodiments, operation 330 can be one example of operation 230 as described with respect to FIG. 2. In some embodiments, memory operations performed by processing logic can include operations such as read operations, erase operations, and write operations, etc.

At operation 411, the processing logic identifies a P/E cycle count associated with a wordline group corresponding to the set of cells containing the target cell. In some embodiments, processing logic can identify other device or segment metrics such as wear-metrics or lifecycle metrics similar to a P/E cycle count. In some embodiments, the processing logic can identify a P/E cycle count associated with a memory device (e.g., the set of cells can encompass all cells within a memory device). In some embodiments, the P/E cycle count can be associated with the target cell. In some embodiments, the P/E cycle count can be associated with the set of cells containing the target cell. In some embodiments, a "target cell" can refer to a cell associated with a read operation to be performed by processing logic. In some embodiments, processing logic can identify or select more than one target cell as part of a read operation.

In some embodiments, the wordline group associated with a set of cells can correspond to a voltage threshold shift. In some embodiments, the wordline group can cause an uneven voltage threshold shifts to the set of cells (e.g., one or more cells can shift up or down by some value, "X," while one or more cells can shift up or down by some value "Y"). In some embodiments, processing logic can compensate for voltage shifts to cells within a given wordline group with additional processing logic. In some embodiments, two or more wordline groups can be associated with the set of cells containing the target cell.

At operation 412, the processing logic identifies the level shift associated with the highest programmable level of the target cell. In some embodiments, the level shift can correspond to a read level voltage shift which can have occurred after a bake or retention period (e.g., the level shift can represent the difference between a read level voltage of a level or cell before a retention period and the read level voltage of a level or cell after a retention period). In some embodiments, the level shift can be the result of a calibrated read (e.g., the level shift can be a calibrated read shift). In some embodiments, processing logic can have previously determined the calibrated read shift while performing an auto read calibration (ARC). In some embodiments, processing logic can store the level shift in a database. In some embodiments, processing logic can alter (e.g., write) the stored level shift. In some embodiments, processing logic might be unable to alter the level shift value after it has been determined and/or recorded (e.g., single write).

In some embodiments, the highest programmable level can correspond to the "last level" of a cell, (e.g., such as an "L1" of an SLC, an "L3" of an MLC, an "L7" of a TLC, an "L15" of a QLC, or an "L31" of a PLC, etc.). In some embodiments, processing logic can reserve the cell level(s) above the highest programmable level (e.g., such as an erase or "reset" state). In some embodiments, the highest programmable level can correspond to the highest programming voltage window (e.g., $V_T$ distribution) at which the processing device can store (and retrieve) a value. In some embodiments, a target cell can refer to a cell associated with a read operation to be performed by processing logic.

At operation 421, the processing logic identifies the read level offset based on the level shift, the P/E cycle count, and the wordline group. In some embodiments, one or more parameters (e.g., memory trims) can correspond to a given read level offset, and the one or more parameters can be stored in a database. In at least one embodiment, a database entry can contain a parameter corresponding to a level shift, a second parameter corresponding to a P/E cycle count, and a third parameter corresponding to a wordline group.

At operation 430, the processing logic performs the read operation in accordance with the read level offset. In some embodiments, the read level offset can correspond to a voltage compensation for a given level. In some embodiments, processing logic can adjust the read reference voltage by a voltage equal to the read level offset. In some embodiments processing logic can perform the read operation on the target cell. In some embodiments, processing logic can perform the read operation on the set of cells containing the target cell. In some embodiments, processing logic can perform the read operation on a memory segment which may not be associated (logically or physically) with the target cell.

Figure 5:
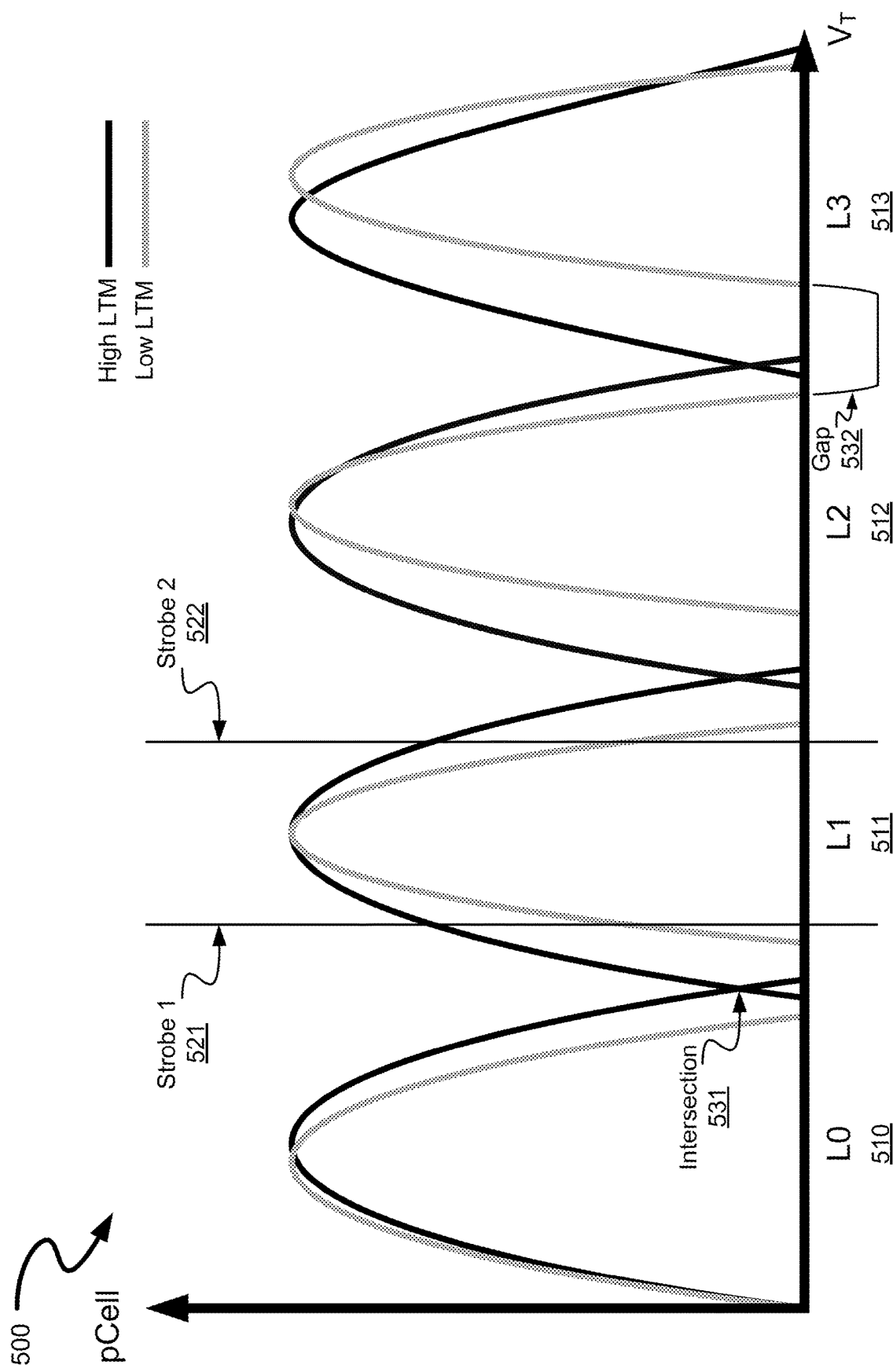
FIG. 5 illustrates an example voltage distribution probability graph of cells in a QLC memory device or segment, in accordance with some embodiments of the present disclosure.

FIG. 5 illustrates an example voltage distribution probability graph 500 of cells in a QLC memory device or segment, in accordance with some embodiments of the present disclosure. In some embodiments, distribution graph 500 can represent a $V_T$ distribution graph of a set of cells subject to a corrective read offset voltage adjustment compensation method, such as method 200 as described with respect to FIG. 2, or method 300 as described with respect to FIG. 3. The vertical axis, "pCell," represents the number of cells at a given voltage threshold ($V_T$) as shown along the horizontal axis.

Level "L0" 510 is an erase or "reset" state, and is non-programmable. Level "L1" 511 is the lowest programmable level, with level "L2" 512 being the next lowest programmable level, and so on, through level "L3" 513, and up to level "L15" (not pictured). Light gray lines denote a "Low" lateral charge migration (LTM), and black lines denote a "High" LTM for each of states "L0" 510, "L1" 511, "L2" 512, and "L3" 513, respectively. A high LTM (e.g., a larger widening of the state-width of a level) can cause the $V_T$ distribution for adjacent levels to overlap, such as at intersection 531. A low LTM (e.g., a smaller widening of the state-width of a level) can cause the $V_T$ distribution for adjacent levels to stay separated, such as at gap 532 (e.g., valley margin). In some embodiments, "Strobe 1" 521 and "Strobe 2" 522 (such as first strobe and second strobe of operations 311, 312, 313, and 314 as described with respect to FIG. 3) can represent read voltage strobes used to measure the state-width (e.g., the $V_T$ distribution width, or portion of $V_T$ distribution width) of Level "L1" 511 (e.g., the lowest programmable level of individual cells within the set of cells of the memory segment or device).

In some embodiments the magnitude of "Strobe 1" 521 can be smaller than the magnitude of "Strobe 2" 522 (e.g., $521_{VOLTAGE} < 522_{VOLTAGE}$). In some embodiments, the magnitude of "Strobe 2" 522 can be smaller than the magnitude of "Strobe 1" 521 (e.g., $522_{VOLTAGE} < 521_{VOLTAGE}$). In some embodiments, the voltage threshold ($V_T$) or voltage magnitude of intersection 531 for Level "L1" 511 can be smaller than both the voltage magnitude of "Strobe 1" 521 and "Strobe 2" 522. In some embodiments, there can be no cells of the set of cells within a memory segment or device with a voltage threshold ($V_T$) at either the voltage level of "Strobe 1" 521 or "Strobe 2" 522.

Figure 6:
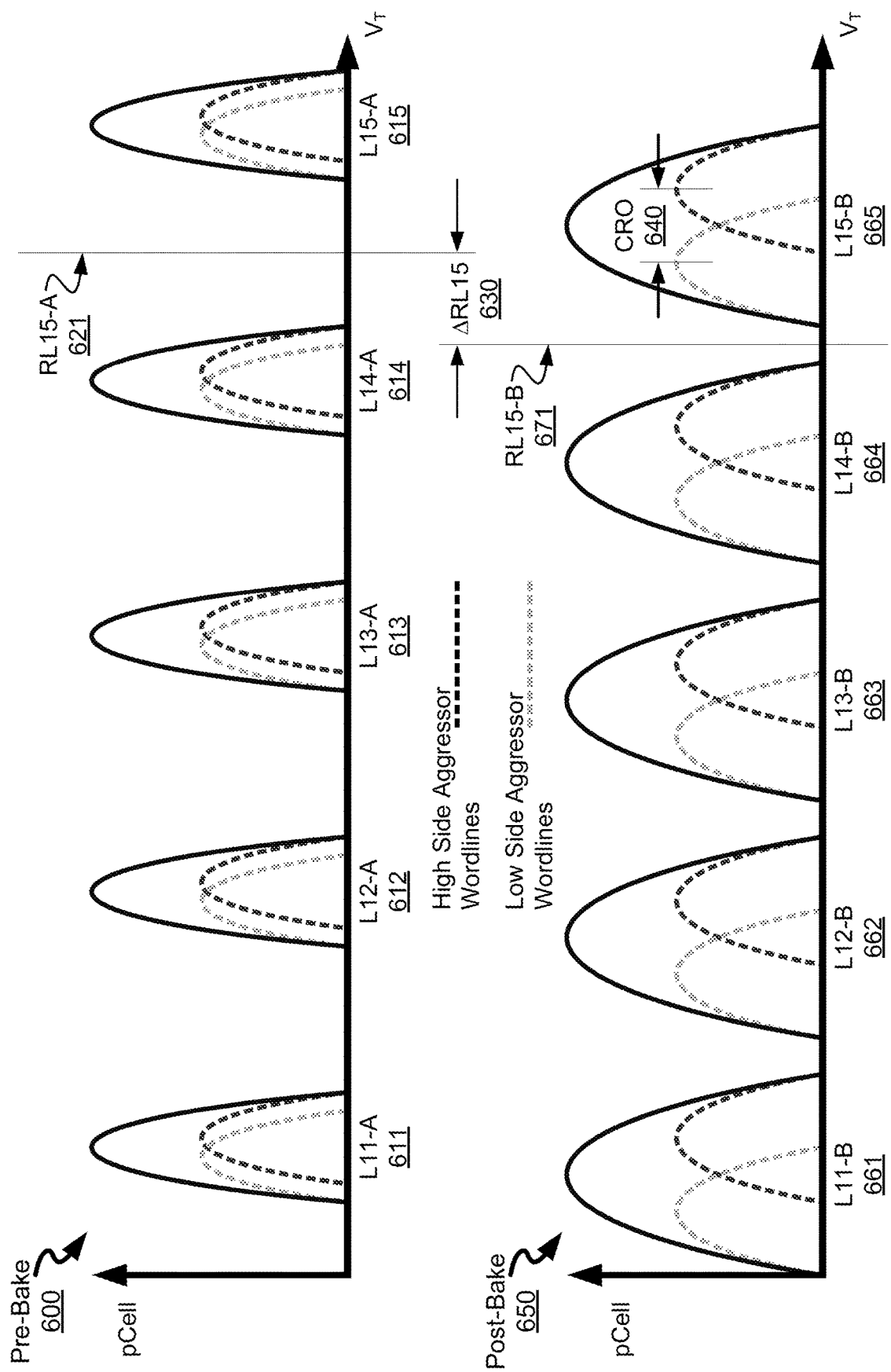
FIG. 6 illustrates example voltage distribution probability graphs of cells in a QLC memory device or segment before and after a retention period, in accordance with some embodiments of the present disclosure.

FIG. 6 illustrates example voltage distribution probability graphs 600, and 650, of cells in a QLC memory device or segment, in accordance with some embodiments of the present disclosure. Graph 600 illustrates level "L11-A" 611, level "L12-A" 612, level "L13-A" 613, level "L14-A" 614, and level "L15-A" 615, before a retention period (i.e., "pre-bake"). Graph 650 illustrates level "L11-B" 661, level "L12-B" 662, level "L13-B" 663, level "L14-B" 664, and level "L15-B" 665, after a retention period (i.e., "post-bake"). In some embodiments, graphs 600 and 650 can represent a $V_T$ distribution graph of a set of cells subject to a corrective read offset voltage adjustment compensation method, such as method 200 as described with respect to FIG. 2, or method 400 as described with respect to FIG. 4.

The vertical axis, "pCell," represents the number of cells at a given voltage threshold ($V_T$) as shown along the horizontal axis.

Read level 15-A (RL15-A) 621 is the read level between states "L14-A" 614 and "L15-A" 615 before a bake or retention period. Read level 15-B (RL15-B) 671 is the read level between states "L14-B" 614 and "L15-B" 615 after a bake or retention period. Delta read level 15 ($\Delta$RL15) 630 is the difference between RL15-A 621 from before the retention period, and RL15-B 671 from after the retention period. Corrective read offset (CRO) 640 is the voltage adjusted corrective read value that can be used to determine a voltage adjustment for a set of cells to compensate for charge migration due to LTM (e.g., state-width widening). Solid black lines on graphs 600 and 650 denote the $V_T$ distribution for levels L11-L15 of the set of cells. Dashed black lines on graphs 600 and 650 denote a $V_T$ distribution of high-side aggressor wordlines with respect to the set of cells. Dashed gray lines on graphs 600 and 650 denote a $V_T$ distribution of low-side aggressor wordlines with respect to the set of cells.

In graph 600, (e.g., pre-bake) the solid black lines enclose a narrower $V_T$ distribution (e.g., state-width) than in graph 650 for levels L11-L15 respectively. Graph 650 shows that each of the states have widened (e.g., $V_T$ distribution has increased for each state) reducing RWB (which can be inversely related to state-width). In graph 600, the dashed black lines (e.g., $V_T$ distributions of high-side aggressor wordlines) and dashed gray lines (e.g., $V_T$ distributions of low side aggressor wordlines) are closer together than in graph 650. In some embodiments, voltage shifts as shown can be caused by SCL and ICL effects. In some embodiments, the shift apart of the aggressor wordlines (e.g., as shown by CRO 640) can be used to determine a lateral charge migration proxy, as a reduction in the RWB (e.g., as shown by $\Delta$RL15 630) can be inversely related to state-width, and can track (e.g., be a proxy for) lateral charge migration.

In some embodiments, state-width, or $V_T$ distribution widening as shown can be predominantly caused by lateral charge migration (LTM). In some embodiments, the effects of LTM can be outweighed by the effects of SCL and/or ICL at higher levels, such as level "L15" 615 in a QLC memory device or segment. In some embodiments, a corrective read offset, such as CRO 640 can be used to extrapolate a read window budget (RWB) for a set of levels (e.g., L0-L15) across a set of cells. In some embodiments, the RWB for the set of levels can correspond to a lateral charge migration value, and thus can be used to apply a corrective read offset to the set of cells.

Figure 7:
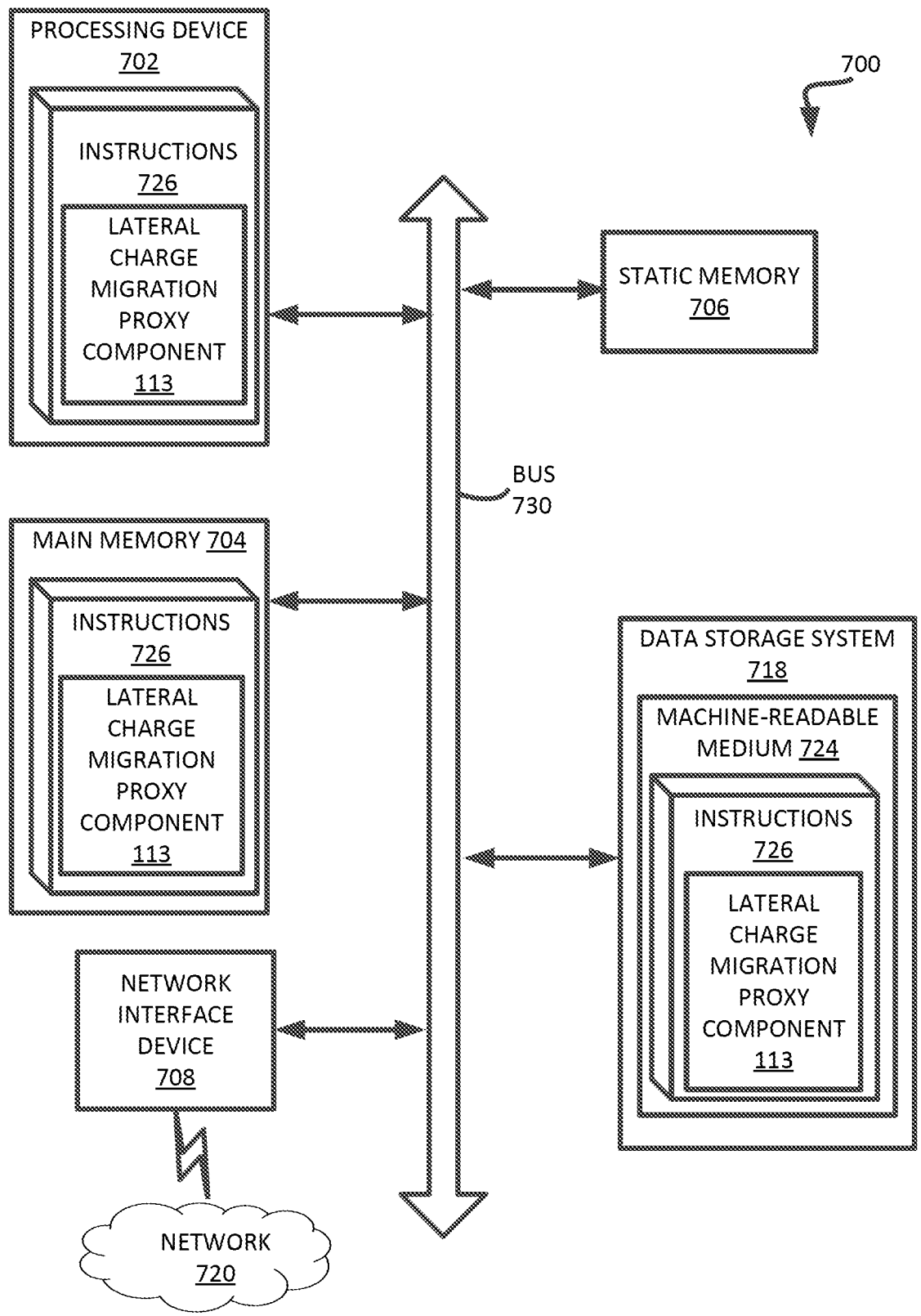
FIG. 7 illustrates an example block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the lateral charge migration (LTM) proxy component 113 of FIGS. 1A-B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1A.

In one embodiment, the instructions 726 include instructions to implement functionality corresponding to a lateral charge migration proxy component (e.g., the lateral charge migration proxy component 113 of FIGS. 1A-B). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium (e.g., a non-transitory computer-readable storage medium), such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
a memory device comprising a plurality of cells, the plurality of cells comprising a set of cells; and
a processing device operatively coupled to the memory device, the processing device to perform operations comprising:
determining a level information associated with the set of cells, wherein the set of cells comprises a target cell associated with a read operation;
identifying a read level offset for the target cell based on the level information; and
performing the read operation in accordance with the read level offset.

2. The memory sub-system of claim 1, wherein the level information comprises a level state-width, and wherein the level information is associated with a lowest programmable level of the set of cells.

3. The memory sub-system of claim 2, the operations further comprising:
issuing a first strobe to the lowest programmable level;
determining, based on the first strobe, a first failed bit count of the lowest programmable level;
issuing a second strobe to the lowest programmable level;
determining, based on the second strobe, a second failed bit count of the lowest programmable level; and
determining the level state-width based on the first failed bit count and the second failed bit count.

4. The memory sub-system of claim 1, wherein to identify the read level offset, the operations further comprise:
identifying a read operation type;
identifying a set of trims associated with the read operation type; and
identifying one or more trims associated with the level information from the set of trims, wherein the read level offset comprises the one or more trims.

5. The memory sub-system of claim 4, wherein the read operation type is a corrective read operation.

6. The memory sub-system of claim 1, wherein the level information comprises a level shift, and wherein the level information is associated with a highest programmable level of the set of cells.

7. The memory sub-system of claim 6, the operations further comprising:
identifying a program/erase (P/E) cycle count associated with a wordline group corresponding to the set of cells;
identifying the level shift associated with the highest programmable level; and
identifying the read level offset based on the level shift, the P/E cycle count, and the wordline group.

8. A method comprising:
determining, by a processing device, a level information of a set of cells, wherein the set of cells comprises a target cell associated with a read operation;
identifying a read level offset for the target cell based on the level information; and performing the read operation in accordance with the read level offset.

9. The method of claim 8, wherein the level information comprises a level state-width, and wherein the level information is associated with a lowest programmable level of the set of cells.

10. The method of claim 9, further comprising:
issuing a first strobe to the lowest programmable level;
determining, based on the first strobe, a first failed bit count of the lowest programmable level;
issuing a second strobe to the lowest programmable level;
determining, based on the second strobe, a second failed bit count of the lowest programmable level; and
determining the level state-width based on the first failed bit count and the second failed bit count.

11. The method of claim 8, further comprising:
identifying a read operation type;
identifying a set of trims associated with the read operation type; and
identifying one or more trims associated with the level information from the set of trims, wherein the read level offset comprises the one or more trims.

12. The method of claim 11, wherein the read operation type is a corrective read operation.

13. The method of claim 8, wherein the level information comprises a level shift, and wherein the level information is associated with a highest programmable level of the set of cells.

14. The method of claim 13, wherein to determine the level information, the method further comprises:
identifying a program/erase (P/E) cycle count associated with a wordline group corresponding to the set of cells;
identifying the level shift associated with the highest programmable level; and
identifying the read level offset based on the level shift, the P/E cycle count, and the wordline group.

15. A non-transitory computer-readable storage medium comprising instructions that, when executed by a processing device, cause the processing device to perform operations comprising:
receiving, by the processing device, a read request to perform a read operation on a target cell of a set of cells of a plurality of cells of a memory device;
determining a level information of the set of cells;
identifying a read level offset for the target cell based on the level information; and
responsive to identifying the read level offset, performing the read operation in accordance with the read level offset.

16. The non-transitory computer-readable storage medium of claim 15, wherein the level information comprises a level state-width, and wherein the level information is associated with a lowest programmable level of the set of cells.

17. The non-transitory computer-readable storage medium of claim 16, the operations further comprising:
issuing a first strobe to the lowest programmable level;
determining, based on the first strobe, a first failed bit count of the lowest programmable level;
issuing a second strobe to the lowest programmable level;
determining, based on the second strobe, a second failed bit count of the lowest programmable level; and
determining the level state-width based on the first failed bit count and the second failed bit count.

18. The non-transitory computer-readable storage medium of claim 15, the operations further comprising:
identifying a read operation type;
identifying a set of trims associated with the read operation type; and
identifying one or more trims associated with the level information from the set of trims, wherein the read level offset comprises the one or more trims.

19. The non-transitory computer-readable storage medium of claim 15, wherein the level information comprises a level shift, and wherein the level information is associated with a highest programmable level of the set of cells.

20. The non-transitory computer-readable storage medium of claim 19, the operations further comprising:
identifying a program/erase (P/E) cycle count associated with a wordline group corresponding to the set of cells;
identifying the level shift associated with the highest programmable level; and
identifying the read level offset based on the level shift, the P/E cycle count, and the wordline group.

* * * * *